United States Patent
Reith

(10) Patent No.: US 9,303,151 B2
(45) Date of Patent: Apr. 5, 2016

(54) STABILIZER MIXTURES FOR HALOGEN-CONTAINING PLASTICS BY UNDERWATER PELLETIZATION

(75) Inventor: Walter Reith, Egenhofen (DE)

(73) Assignee: IKA INNOVATIVE KUNSTSTOFFAUFBEREITUNG GMBH & CO. KG, Wolfen (DE)

( * ) Notice: Subject to any disclaimer, the term of this patent is extended or adjusted under 35 U.S.C. 154(b) by 267 days.

(21) Appl. No.: 13/583,692

(22) PCT Filed: Feb. 8, 2011

(86) PCT No.: PCT/EP2011/051827
§ 371 (c)(1),
(2), (4) Date: Sep. 10, 2012

(87) PCT Pub. No.: WO2011/110395
PCT Pub. Date: Sep. 15, 2011

(65) Prior Publication Data
US 2013/0005877 A1    Jan. 3, 2013

(30) Foreign Application Priority Data
Mar. 11, 2010 (DE) .......... 10 2010 011 191

(51) Int. Cl.
| | |
|---|---|
| C08K 9/00 | (2006.01) |
| B29B 9/06 | (2006.01) |
| C08K 5/00 | (2006.01) |
| B29B 7/02 | (2006.01) |
| C08L 27/04 | (2006.01) |
| B01J 2/20 | (2006.01) |

(52) U.S. Cl.
CPC ... *C08K 9/00* (2013.01); *B01J 2/20* (2013.01); *B29B 7/02* (2013.01); *B29B 9/065* (2013.01); *C08K 5/0008* (2013.01); *C08L 27/04* (2013.01)

(58) Field of Classification Search
CPC .......... C08K 5/0008; C08L 27/04; B29B 7/02
USPC ........................................................ 264/141
See application file for complete search history.

(56) References Cited

U.S. PATENT DOCUMENTS

| | | | | |
|---|---|---|---|---|
| 3,461,081 | A * | 8/1969 | Shyoji et al. ............. | 252/400.51 |
| 5,176,751 | A * | 1/1993 | Findley ........................ | 106/502 |
| 5,200,503 | A * | 4/1993 | Chen ............................... | 524/81 |
| 5,744,525 | A | 4/1998 | Harvey et al. | |
| 6,632,389 | B1 | 10/2003 | Ernst et al. | |
| 2006/0188428 | A1* | 8/2006 | Wakabayashi et al. ....... | 423/430 |
| 2007/0293612 | A1* | 12/2007 | Reith ............................ | 524/259 |
| 2008/0023673 | A1* | 1/2008 | Reith et al. ............... | 252/400.61 |
| 2008/0132616 | A1* | 6/2008 | Reith ............................ | 524/101 |
| 2009/0194617 | A1 | 8/2009 | Breitenstein et al. | |
| 2011/0184100 | A1* | 7/2011 | Horton ......................... | 524/109 |
| 2011/0306695 | A1* | 12/2011 | Heris et al. .................... | 521/145 |
| 2012/0208941 | A1* | 8/2012 | Reith ............................ | 524/403 |
| 2013/0005877 | A1* | 1/2013 | Reith ............................ | 524/101 |

FOREIGN PATENT DOCUMENTS

| | | |
|---|---|---|
| DE | 10051739 | 4/2002 |
| DE | 10 2006 013 062 | 9/2007 |
| EP | 0330889 | 9/1989 |
| FR | 1543107 | 10/1968 |
| GB | 1405626 | 9/1975 |
| NL | 7811090 | 5/1980 |
| WO | 99/31165 | 6/1999 |
| WO | 00/63284 | 10/2000 |
| WO | 2005/078015 | 8/2005 |

* cited by examiner

*Primary Examiner* — Michael A Salvitti
(74) *Attorney, Agent, or Firm* — Klauber & Jackson LLC

(57) ABSTRACT

The present invention relates to a process for producing a pelletized stabilizer mixture for halogen-containing plastics, comprising the following steps:
(a) heating, at from 40 to 100° C. in an extruder or kneader, a mixture comprising
  (A) at least one lubricant,
  (B) at least one substance having stabilizer activity, and
  (C) auxiliaries and additives,
  where at least 1% by weight of all of the substances, based on the total amount of the mixture, has a melting point below 100° C.,
(b) forcing the material through a pelletizing die,
(c) carrying out die-face pelletization under water,
(d) transporting the pelletized stabilizer mixture away in a stream of water,
(e) extracting the pelletized stabilizer mixture from the water, and
(f) drying the pelletized stabilizer mixture.

The present invention further relates to pelletized stabilizer mixtures producible therefrom, and also to use of these.

4 Claims, No Drawings

STABILIZER MIXTURES FOR HALOGEN-CONTAINING PLASTICS BY UNDERWATER PELLETIZATION

CROSS REFERENCE TO RELATED APPLICATIONS

The present application is a National Stage Application claiming the priority of co-pending PCT Application No. PCT/EP2011/051827 filed Feb. 8, 2011, which in turn, claims priority from German Application Serial No. 10 2010 011 191.0 filed Mar. 11, 2010. Applicants claim the benefits of 35 U.S.C. §120 as to the PCT application and priority under 35 U.S.C. §119 as to the said German application, and the entire disclosures of both applications are incorporated herein by reference in their entireties.

The present invention relates to pelletized stabilizer mixtures, for producing these, and also use of these.

The use of plastics, in particular of halogen-containing plastics, is constantly increasing. In particular, halogen-containing plastics are increasingly used as materials for construction and other purposes.

Halogen-containing plastics have a known tendency toward undesired decomposition reactions and undesired degradation reactions when exposed to thermal stress during processing or in long-term service. This problem can be solved by using stabilizers which are added to the halogen-containing polymers prior to or during processing. Among the known stabilizers are barium-cadmium stabilizers, lead stabilizers, organotin stabilizers, and barium-zinc stabilizers.

Alongside these heavy-metal-containing metal stabilizers, which raise toxicological concerns, environmentally safe systems have increasingly been devised in recent years, and these have also already been marketed. These are solid stabilizers and, for reasons of environmental compatibility, are mostly handled in compacted form. Said systems are multi-component mixtures of which the main constituent mostly comes from the substance group of the hydrotalcites (magnesium aluminum hydroxycarbonate).

Heavy-metal-free hydrotalcite and, respectively, hydrocalumite compositions functioning as heat stabilizer for PVC are described by way of example in EP-B 1 046 668 and EP-B 0 930 332.

However, these classes of compound are relatively expensive and useful only to a limited extent because the naturally occurring forms are not available in sufficient quantity or have heavy-metal-containing impurities, mainly iron carbonates and manganese carbonates. These impurities drastically reduce stabilizer effect in PVC.

Synthetic processes therefore have to be adopted to permit wider access to these classes of substance. However, industrial-scale production is expensive, because of the raw materials involved. The production process is also hindered by considerable amounts of waste water, because of the magnesium salts, calcium salts, and aluminum salts that have to be used. This is a fact that cannot be ignored in large-scale industrial synthesis processes. It is therefore still necessary to search for substances which are less expensive. These should, as far as possible, be accessible in an environmentally compatible manner, without excessive use of resources.

This object has been achieved to some extent in recent years by the availability of chemically modified dolomites rendered more effective by a calcining process, since dolomites per se do not function as stabilizers. Access to these compounds is based on semisynthetic processes, since naturally occurring minerals can be used as starting materials. These minerals (dolomites) are available in enormous quantities and often with a purity that does not require any further purification process with attendant waste water problems. Various additives have been used to improve the quality levels of products and of performance. Reference may be made here by way of example to EP-A 0 422 335 and EP-A 0 945 483. US-A 2006/0188428 has published a semisynthetic production process.

Stabilizer mixtures can be produced not only in various chemical compositions but also in various supply forms. The stabilizer mixtures are usually used in powder form or in the form of compressed pellets. However, a disadvantage of powders is that they have a tendency, depending on the composition, toward demixing during transport and/or conveying. Any handling in a system that is not completely closed moreover causes considerable dusting, which is detrimental not only to health but also to the environment.

Compressed pellets are not susceptible to demixing, but here again abrasion and fracture produce considerable amounts of dust. Errors during pelletization, for example unsuitable pelletizing aid or inadequate amount of pelletizing aid, or excessive pressure, can moreover produce very hard pellets which do not disperse completely during the mixing process and then cause defects in the final product.

Pastilles (tablets) are another product form, and are markedly less dusting and more abrasion-resistant than compressed pellets. For tablet production, the stabilizer mixture is usually heated in a tank, with stirring, and the melt is then deposited in the form of droplets on a cooled belt by way of a suitable device. Temperatures of about 130° C. are needed to produce a melt, if the required viscosity is to be reached. However, the relatively high temperatures considerably restrict the selection of the additives. Various additives react with one another at these temperatures. The composition of the mixture, and therefore its effectiveness, changes with time. For certain demanding applications, e.g. windows or panels, it is therefore usually not possible to produce the modern calcium/zinc stabilizers in this dust-free form with its good storage properties and conveying properties. Two-component systems are marketed, in which the supply form of one portion of the additives is pastille and the supply form of another portion, with the sensitive component, is powder mixture or compressed pellet, but these systems are not practicable for every user.

The pelletization process is generally and usually undertaken in a pelletizer. A pelletizer is a machine which has a die and which is used to produce particles in the millimeter size range by comminution from strands or from relatively large quanta.

The prior art has hitherto not described any process for producing low-dusting stabilizer mixtures in pellet form.

The object of the present invention consists in providing a process which, at minimized temperatures, can produce low-dusting pelletized stabilizer mixtures which have good miscibility, and low susceptibility to fracture and to abrasion, for halogen-containing plastics.

The object is achieved inter alia through a process for producing a pelletized stabilizer mixture for halogen-containing plastics, comprising the following steps:
(a) heating, at from 40 to 100° C. in an extruder or kneader, a mixture comprising
(A) at least one lubricant,
(B) at least one substance having stabilizer activity, and
(C) auxiliaries and additives,
where at least 1% by weight of all of the substances, based on the total amount of the mixture, has a melting point below 100° C.,
(b) forcing the material through a pelletizing die, (c) carrying out die-face pelletization under water,
(d) transporting the pelletized stabilizer mixture away in a stream of water,
(e) extracting the pelletized stabilizer mixture from the water, and
(f) drying the pelletized stabilizer mixture.

An advantage of the present invention is that it is possible to use only a portion of the total amount of lubricant (A), of substance (B) having stabilizer activity, and/or of auxiliaries and additives (C) in liquefied or low-viscosity form, and that no pressing of the, for example, high-melting-point substances takes place. Good dispersion of the pellets in the mixer is thus obtained. The high-melting-point substances are moreover coated by low-melting-point substances.

Another advantage of the process of the invention is constant quality and composition of the pelletized stabilizer mixture for halogen-containing plastics.

For the purposes of the present invention, the expression "melting point" means the lower value of a melting range, to the extent that a substance has such a range.

In one preferred embodiment of the process of the invention, at least 10% by weight of all of the substances of the mixture have a melting point below 100° C. It is particularly preferable that at least 13% by weight of all of the substances of the mixture have a melting point below 100° C.

With further preference, at most 75% by weight of all of the substances of the mixture, with further preference at most 50% by weight, and with further preference at most 40% by weight, have a melting point of at most 100° C.

The at least one lubricant (A) can be one selected from the group of the waxes and esters.

In one particularly preferred embodiment of the present invention, component (A) involves compounds selected from the group consisting of montan waxes, aromatic or aliphatic esters, fatty acid esters, amide waxes, polyethylene waxes, chloroparaffins, glycerol esters or alkaline-earth-metal soaps, modified polyethylene waxes, synthetic hard waxes, fatty ketones, and combinations thereof as listed by way of example in EP-A 0259783.

The following can also be used as substance (A): oxidized PE waxes and/or Fischer-Tropsch paraffins, and also coarse-crystalline paraffin waxes.

In general terms, waxes are substances nowdays defined by their mechanical-physical properties. However, their chemical composition and origin can differ widely. For the purposes of the present invention, a substance is preferably termed wax if at 20° C. it is kneadable and solid to brittle, has a coarse to fine-crystalline structure, is translucently to opaquely colored, but not glassy, melts above 40° C. without decomposition, is a free-flowing (low-viscosity) liquid above the melting point, has markedly temperature-dependent consistency and solubility, and also can be polished by applying gentle pressure, or at least when no more than one of these properties is not present (see also the definition of the Deutschen Gesellschaft für Fettwissenschaft [German Society for the Science of Fats] (DGF unitary method M-I1 (75)). A distinction is made between the following types of wax: firstly waxes from animal and vegetable sources, and secondly mineral waxes and synthetic waxes. In chemical terms, main components of these substance mixtures are esters of fatty acids with long-chain, aliphatic, primary alcohols, known as wax alcohols. The structure of these esters differs from that of fats and oils, where these are triglycerides with fatty acids.

Examples of animal-derived waxes are cetaceum and beeswax. Examples of vegetable-derived waxes are sugar-cane wax and carnauba wax from the carnauba palm. Jojoba oil is not composed of triglycerides and is not therefore a lipogenous oil, but instead in chemical terms is a liquid wax. Wax layers on leaves and fruits serve to prevent loss of water from plants.

Geological mineral waxes (ozocerite and ceresine, produced therefrom) consist essentially of hydrocarbons. Synthetic waxes are obtained mainly from petroleum. The main product is solid paraffin, which is used by way of example for candles and shoe polish. Specific applications use chemically modified natural waxes or fully synthesized waxes (polyethyl-enes, copolymers). Soy wax can also be produced by hydrogenating soya.

In the process of the invention, the at least one substance (B) having a stabilizer activity is selected from the group consisting of an inner complex selected from the group consisting of coordination polymers, metal inner complexes, heavy-metal-containing stabilizers, Ca/Zn stabilizers based on hydrotalcite, zeolites and dawsonites, hydrocalumites, stearoylbenzoylmethane, and sterically hindered amines (HALS), heterocyclic amino alcohols, and antioxidants, inorganic and organic bases, epoxides and glycidyl compounds, β-diketones and β-ketoesters, polyols, and sugar alcohols, and phosphorous esters.

Sterically hindered amines (HALS) and heterocyclic amino alcohols

Sterically hindered amines generally involve compounds comprising the following group:

in which A and V are mutually independently $C_{1-8}$-alkyl, $C_{3-8}$-alkenyl, $C_{5-8}$-cycloalkyl, or $C_{7-9}$-phenylalkyl, or optionally together form $C_{2-5}$-alkylene interrupted by O, by NH, or by $CH_3$—N, or involve a cyclic sterically hindered amine, in particular a compound from the group of the alkyl- or polyalkylpiperidines, especially the tetramethylpiperidines comprising the following group:

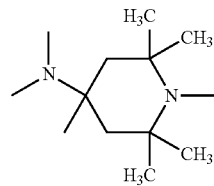

Examples of these polyalkylpiperidine compounds are the following (where n and r are in the range from 2 to 200 for the oligomeric or polymeric compounds, preferably in the range from 2 to 10, in particular from 3 to 7). A comprehensive list of these compounds is found in EP-A 0 796 888 B1.

For the purposes of one particularly preferred embodiment of the present invention, amino alcohols used comprise heterocyclic compounds. Examples of these are: EO-, PO-, and BO-reaction products of ethylene- and propyleneureas, of parabanic acid, of hydantoins, of barbituric acids, of glycolurils, and of isocyanuric acids.

For the purposes of the present invention, particular preference is given to the use of tris(hydroxyethyl) isocyanurate (THEIC) or tris(hydroxypropyl) isocyanurate.

The hydrotalcites can be Al/Mg/carbonate-, Al/Mg/Ti/carbonate-, Li/Mg/carbonate-, or Li/Al/Mg/carbonate-based, and compounds from the group of the hydrotalcites can be described by the following general formula:

$$M^{2+}{}_{1-x}M^{3+}{}_x(OH)_2(A'')_{x/b}*dH_2O$$

where $M^{2+}$=cation of one or more metals of the group of Mg, Ca, and Sr, Zn, and Sn, $M^{3+}$=an Al cation or B cation, $A''$ is an anion of valency n, b=n is a number from 1 to 2, 0<x<0.5, d is a number from 0 to 20. Preference is given to compounds where $A''$=OH$^-$, ClO$_4^-$, HCO$_3^-$, CH$_3$COO$^-$, C$_6$H$_5$COO$^-$, CO$_3^{2-}$, (CHOH—COO)$_2^{2-}$, (CH$_2$COO)$_2^{2-}$, CH$_3$CHOHCOO$^-$, HPO$_3^-$, or HPO$_4^{2-}$.

Examples of hydrotalcites are
Al$_2$O$_3$*6MgO*CO*12H$_2$O, Mg$_{4.5}$Al$_2$(OH)$_{13}$*CO$_3$*3.5H$_2$O, 4MgO*Al$_2$O$_3$*CO$_2$*9H$_2$O, 4MgO*Al$_2$O$_3$*CO$_2$*6H$_2$O, ZnO*3MgO*Al$_2$O$_3$*CO$_2$*8-9H$_2$O, and ZnO*3MgO*Al$_2$O$_3$*CO$_2$*5-6H$_2$O.

It is very particularly preferable to use anhydrous hydrotalcites.

Zeolites can be described by the formula $M_{x/n}[(AlO_2)_x(SiO_2)_y]*w\,H_2O$, in which n is the charge on the cation M; M is an element of the first or second main group, for example Li, Na, K, or NH$_4$, or else Mg, Ca, Sr, or Ba; y:x is a number from 0.8 to 15, preferably from 0.8 to 1.2; and w is a number from 0 to 300, preferably from 0.5 to 30.

Examples of zeolites are sodium aluminosilicates of the formulae Na$_{12}$Al$_{12}$Si$_{12}$O$_{48}$*27H$_2$O [zeolite A], Na$_6$Al$_6$Si$_6$O$_{24}$*2NaX*7.5H$_2$O, X=OH, halogen, ClO$_4$ [sodalite]; Na$_6$Al$_6$Si$_{30}$O$_{72}$*24H$_2$O; Na$_8$Al$_8$Si$_{40}$O$_{96}$*24H$_2$O; Na$_{16}$Al$_{16}$Si$_{24}$O$_{80}$*16H$_2$O; Na$_{16}$Al$_{16}$Si$_{32}$O$_{96}$*16H$_2$O; Na$_{56}$Al$_{56}$Si$_{136}$O$_{384}$*250H$_2$O [zeolite Y], Na$_{86}$Al$_{86}$Si$_{106}$O$_{384}$*264H$_2$O [zeolite X]; Na$_2$O, Al$_2$O$_3$, (2-5) SiO$_2$, (3.5-10)H$_2$O [zeolite P]; Na$_2$O, Al$_2$O$_3$, 2SiO$_2$,*(3.5-10)H$_2$O (zeolite MAP); or the zeolites that can be described via partial or complete replacement of the Na atoms by atoms of Li, of K, of Mg, of Ca, of Sr, or of Zn, for example (Na,K)$_{10}$Al$_{10}$Si$_{22}$O$_{64}$*20H$_2$O; Ca$_{4.5}$Na$_3$[(AlO$_2$)$_{12}$(SiO$_2$)$_{12}$]*30H$_2$O; K$_9$Na$_3$[(AlO$_2$)$_{12}$(SiO$_2$)$_{12}$]*27H$_2$O. Very particular preference is given to Na zeolite A and Na zeolite MAP (see also U.S. Pat. No. 6,531,533). Preference is equally given to zeolites with extremely small particle size, in particular of the Na A type and Na P type, as also described in U.S. Pat. No. 6,096,820.

Dawsonites are described by the general formula $$M[Al(OH)_2CO_3](M=Na,K).$$

U.S. Pat. No. 3,501,264 and U.S. Pat. No. 4,221,771, and also EP 0394.670 A1, have published the production of Na dawsonite (DASC or SAC) and K dawsonite (DAPC). A hydrothermal or non-hydrothermal synthesis can be used. The products can be crystalline or amorphous. The substance class also incorporates sodium magnesium aluminocarbonates (SMAC); U.S. Pat. No. 455,055,284 has described the production of these.

Antioxidants

Among these are sterically hindered phenols, for example alkylated monophenols, e.g. 2,6-di-tert-butyl-4-methylphenol, alkylthiomethylphenols, e.g. 2,4-dioctylthiomethyl-6-tert-butylphenol, alkylated hydroquinones, e.g. 2,6-di-tert-butyl-4-methoxyphenol, hydroxylated thiodiphenyl ether, e.g. 2,2'-thiobis(6-tert-butyl-4-methylphenol), alkylidenebisphenols, e.g. 2,2'-methylenebis(6-tert-butyl-4-methylphenol), benzyl compounds, e.g. 3,5,3',5'-tetra-tert-butyl-4,4'-dihydroxydibenzyl ether, hydroxybenzylated malonates, e.g. dioctadecyl 2,2-bis(3,5-di-tert-butyl-2-hydroxybenzyl)malonate, hydroxybenzyl aromatics, e.g. 1,3,5-tris(3,5-di-tert-butyl-4-hydroxybenzyl)-2,4,6-trimethylbenzene, triazine compounds, e.g. 2,4-bisoctylmercapto-6-(3,5-di-tert-butyl-4-hydroxyanilino)-1,3,5-triazine, phosphonates and phosphonites, e.g. dimethyl 2,5-di-tert-butyl-4-hydroxybenzylphosphonate, azylaminophenols, e.g. 4-hydroxylauranilide, esters of beta-(3,5-di-tert-butyl-4-hydroxyphenyl)propionic acid, of beta-(5-tert-butyl-4-hydroxy-3-methylphenyl)propionic acid, of beta-(3,5-dicyclohexyl-4-hydroxyphenyl)propionic acid, ester of 3,5-di-tert-butyl-4-hydroxyphenylacetic acid with mono- or polyhydric alcohols, amides of β-(3,5-di-tert-butyl-4-hydroxyphenyl) propionic acid, e.g. N,N'-bis(3,5-di-tert-butyl-4-hydroxyphenylpropionyl)hexamethylenediamine, vitamin E (tocopherol), and derivatives, and also D,L-ascorbic acid.

IRGANOX 1046® can moreover also be used as antioxidant.

An example of an amount that can be used of the antioxidants is from 0.01 to 10 parts by weight, advantageously from 0.1 to 10 parts by weight, and in particular from 0.1 to 5 parts by weight, based on 100 parts by weight of PVC.

A component of the at least one substance (B) having stabilizer activity can by way of example be a lead stabilizer or organotin stabilizer. A lead stabilizer is preferred. It is moreover also possible that further metal-containing stabilizers are present in one of the components of the substance (B) having stabilizer activity.

Particular preference is given to calcium-zinc stabilizers based on hydrotalcite or barium-zinc stabilizers. It is preferable that these comprise appropriate metal carboxylates, in particular metal carboxylates of fatty acids.

In another preferred embodiment of the present invention, the at least one substance (B) having stabilizer activity is a compound selected from hydrotalcite, zinc stearate, calcium acetylacetonate, trishydroxyethyl isocyanurate, stearoylbenzoylmethane (trade name, for example, Rhodiastab P 55), and at least one antioxidant.

It is also possible to use lead-containing stabilizers for the present invention. For the purposes of the present invention, all organic or inorganic lead compounds are in principle suitable as lead-containing stabilizers for the at least one substance (B) having stabilizer activity (lead stabilizers). Examples of particularly suitable substances are basic lead salts of inorganic acids, such as tribasic lead sulfate, tetrabasic lead sulfate, dibasic lead phosphite, or dibasic lead phosphite sulfite, or lead carbonate (white lead), lead salts of linear or branched, saturated or unsaturated, aliphatic or aralipathic, or aromatic, organic monocarboxylic acids, such as acetic acid, propionic acid, butyric acid, valeric acid, hexanoic acid, enanthic acid, octanoic acid, neodecanoic acid, 2-ethylhexanoic acid, pelargonic acid, decanoic acid, undecanoic acid, dodecanoic acid, (lauric acid), tridecanoic acid, myristic acid, palmitic acid, 3,6-dioxaheptanoic acid, 3,6,9-trioxadecanoic acid, behenic acid, benzoic acid, p-tert-isostearic acid, stearic acid, 12-hydroxystearic acid, 9,10-dihydroxystearic acid, oleic acid, butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, sorbic acid, cinnamic acid, acrylic acid, methacrylic acid, rosin acid (abietic acid); dicarboxylic acids and monoesters of these, or hydroxycarboxylic acids, for example oxalic acid, malonic acid, maleic acid, fumaric acid, tartaric acid, mandelic acid, malic acid, glycolic acid, polyglycolic dicarboxylic acids having a degree of polymerization of from about 10 to about 12, phthalic acid, isophthalic acid, terephthalic acid, or hydroxyphthalic acid; tri- or tetracarboxylic acids, and mono-, di-, or triesters of these, for example hemimellitic acid, trimellitic acid, pyromellitic acid, or citric acid, or dimerized or trimerized linoleic acid. Equally suitable are cycloaliphatic carboxylic acids, such as cyclohexane carboxylic acid, tetrahydrophthalic acid, 4-methyltetrahydrophthalic acid, hexahydrophthalic acid, endomethylenetetrahydrophthalic acid, or 4-methylhexahydrophthalic acid. Particularly suitable substances here are neutral or basic lead stearate, white lead, tri- or tetrabasic lead sulfate, dibasic lead phosphite, dibasic lead phthalate, or tetrabasic lead fumarate. Very particular preference is given to dibasic lead phosphite and tribasic lead sulfate.

Equally suitable lead compounds for the substance (B) having stabilizer activity are products such as those obtainable through reaction of lead oxide with hydroxycarboxylic acids, for example dimethylolpropionic acid. Compounds of this type and production thereof are described in EP 0 313 113.

Preference is also given to lead phosphite or lead sulfate, or to mixtures of these with at least one organic lead compound, in particular with a lead carboxylate, preferably lead stearate or lead oleate. Very particular preference is given to dibasic lead phosphite and tribasic lead sulfate and blends of these with lead stearate or with calcium stearate or, respectively, a combination of these with calcium zinc fatty acid carboxylates.

The content of lead stabilizers in a stabilizer system of the invention is at least 5% by weight, preferably from 10 to 95% by weight, particularly preferably from 20 to 90% by weight, and very particularly preferably from 30 to 75% by weight. In the case of basic lead stabilizers, the proportion of base preferably varies from 1:1 to 10:1.

For the purposes of the present invention, calcium-zinc stabilizers or barium-zinc stabilizers suitable as substance (B) having stabilizer activity comprise inorganic compounds of calcium, of barium, and of zinc, and also in principle all of the carboxylates of calcium, of barium, and of zinc, and also the phenolates of these metals. Examples of particularly suitable substances are zinc oxide, calcium hydroxide, barium hydroxide, or zinc hydroxide, calcium sulfate, barium sulfate, or zinc sulfate, zinc carbonate or barium carbonate, barium nonylphenolate, zinc sulfide, barium oxide or zinc oxide, barium hydroxide or zinc hydroxide, or addition compounds, such as superbasic calcium carbonates, superbasic barium carbonates, or superbasic zinc carbonates, or the corresponding superbasic carboxylates. The carboxylates derive from the carboxylic acids described by way of example above for lead stabilizers.

The stabilizer system of the invention can moreover comprise further metal-containing stabilizers.

It is preferable that these involve at least one calcium-zinc stabilizer or barium-zinc stabilizer, where these preferably comprise the corresponding metal carboxylates.

The at least one substance (B) having stabilizer activity can comprise, alongside the metal stabilizers mentioned, at least one inner complex selected from the group consisting of the following coordination polymers: catena-μ-2,2',2''-nitrilotrisethanolperchlorato metal inner complex and coordination polymers catena-μ-2,2',2''-nitrilotrisethanoltrifluoromethanesulfonato (triflato) metal inner complex.

The substance (B) having stabilizer activity can therefore comprise this type of perchlorato inner complex, a plurality of perchlorato inner complexes of this type and no triflato inner complex, a triflato inner complex of this type, a plurality of triflato inner complexes of this type and no perchlorato inner complex, or not only perchlorato complexes but also triflato complexes.

The substance (B) having stabilizer activity can more comprise further stabilizers.

It is further preferable that the substance (B) having stabilizer activity comprises only the abovementioned combination of lead stabilizer or organotin stabilizer and inner complex.

If a catena-μ-2,2',2''-nitrilotrisethanolperchlorato (triflato) metal inner complex coordination polymer is used for the at least one substance (B) having stabilizer activity, it is preferable that an inner complex is involved which has the monomer unit of the formula (I) as substance (B) having stabilizer activity

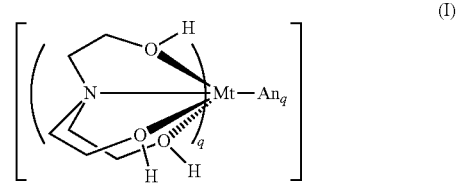

where
Mt=Li, Na, K, Mg, Ca, Sr, Ba, or Zn;
An=OClO₃ or OS(O₂)CF₃;
q=1 or 2.

It is preferable that An=OClO₃. Another preferred embodiment is therefore a substance (B) having stabilizer activity in which the at least one inner complex is a catena-μ-2,2',2''-nitrilotrisethanolperchlorato metal inner complex coordination polymer.

It is further preferable that Mt=Na. Another preferred embodiment is therefore a substance (B) having a stabilizer activity in which the metal of the inner complex is sodium.

The following inner complexes may be listed, and abbreviations used here are perchlorato=Pc and triflato=Tf:
[(TEA) NaPc], [(TEA) NaTf], [(TEA) LiPc], [(TEA) LiTf], [(TEA) KPc], [(TEA) KTf], [(TEA)₂Mg(Pc)₂], [(TEA)₂Mg(Tf)₂], [(TEA)₂Ca(Pc)₂], [(TEA)₂Ca(Tf)₂], [(TEA)₂Sr(Pc)₂], [(TEA)₂Sr(Tf)₂], [(TEA)₂Zn(Pc)₂], [(TEA)₂Zn(Tf)₂], [(TEA)₂Ba(Pc)₂], [(TEA)₂Ba(Tf)₂].

It is equally preferable to use, as substance (B) having stabilizer activity, catena-μ-2,2',2''-nitrilotrisethanolperchlorato sodium inner complex coordination polymer.

Other substances which can moreover be used as substances (B) having stabilizer activity are those selected from the group consisting of:
inorganic and organic bases
epoxides and glycidyl compounds
β-diketones and β-ketoesters
polyols and sugar alcohols
phosphorous esters (phosphites)

Inorganic and Organic Bases

Inorganic bases are suitable substances (B) having stabilizer activity, examples being oxides or hydroxides of magnesium, of calcium, of barium, of aluminum, and of zinc, or organic bases, such as melamine, cyanoguanidine, and guanamines, such as aceto- and benzoguanamine, triethanolamine, triisopropanolamine, tripropanolamine, triisobutanolamine, tributanolamine, and reaction products of α-olefin oxides with primary and second-ary amines.

Epoxides and Glycidyl Compounds

Examples of epoxy compounds are epoxidized soy oil, epoxidized olive oil, epoxidized linseed oil, epoxidized castor oil, epoxidized peanut oil, epoxidized corn oil, and epoxidized cottonseed oil.

Examples of glycidyl compounds are compounds having the glycidyl group:

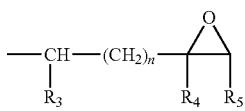

which can have direct bonding to carbon atoms, to oxygen atoms, to nitrogen atoms, or to sulfur atoms, and in which either both of $R_3$ and $R_5$ are hydrogen, $R_4$ is hydrogen or methyl, and n=0, or in which $R_3$ and $R_5$ together are —$CH_2$—$CH_2$— or —$CH_2$—$CH_2$—$CH_2$—, and $R_4$ is then hydrogen, and n=0 or 1.

1) Glycidyl and β-methylglycidyl esters obtainable via reaction of a compound having at least one carboxy group in the molecule and epichlorohydrin and, respectively, glycerol dichlorohydrin and, respectively, β-methylepichlorohydrin. The reaction is usefully carried out in the presence of bases.

Compounds that can be used that have at least one carboxy group in the molecule are aliphatic carboxylic acids. Examples of these carboxylic acids are glutaric acid, adipic acid, pimelic acid, suberic acid, azelaic acid, sebacic acid, or dimerized or trimerized linoleic acid, acrylic and methacrylic acid, caproic acid, caprylic acid, pelargonic acid, lauric acid, myristic acid, palmitic acid, and stearic acid.

However, it is also possible to use cycloaliphatic carboxylic acids, e.g. cyclohexanecar-boxylic acid, tetrahydrophthalic acid, 4-methyltetrahydrophthalic acid, hexahydrophthalic acid, or 4-methylhexahydrophthalic acid.

Aromatic carboxylic acids can also be used, examples being benzoic acid, phthalic acid, isophthalic acid, trimellitic acid, or pyromellitic acid.

It is also possible to use carboxy-terminated adducts, e.g. of trimellitic acid and of polyols, such as glycerol or 2,2-bis(4-hydroxycyclohexyl)propane.

EP 0 506 617 reveals further epoxy compounds that can be used for the purposes of this invention.

II) Glycidyl or β-methylglycidyl ethers obtainable via reaction of a compound having at least one free alcoholic hydroxy group and/or phenolic hydroxy group with a suitably substituted epichlorohydrin under alkaline conditions, or in the presence of an acidic catalyst with subsequent alkali treatment.

Ethers of this type derive by way of example from acyclic alcohols, such as ethylene glycol, diethylene glycol, and higher poly(oxyethylene) glycols, propane-1,2-diol, or poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, bistrimethylolpropane, pentaerythritol, or sorbitol, or else from polyepichlorohydrins, butanol, amyl alcohol, or pentanol, or else from monohydric alcohols, such as isooctanol, 2-ethylhexanol, or isodecanol, or else from $C_7$-$C_9$-alkanol mixtures and $C_9$-$C_{11}$-alkanol mixtures.

However, they also derive by way of example from cycloaliphatic alcohols, such as 1,3- or 1,4-dihydroxycyclohexane, bis(4-hydroxycyclohexyl)methane, 2,2-bis(4-hydroxycyclohexyl)propane, or 1,1-bis(hydroxymethyl)cyclohex-3-ene, or they can have aromatic rings, examples being N,N-bis(2-hydroxyethyl)aniline, or p,p'-bis(2-hydroxyethylamino)diphenylmethane.

The epoxy compounds can also derive from mononuclear phenols, for example from phenol, resorcinol, or hydroquinone; or they can be based on polynuclear phenols, for example on bis(4-hydroxyphenyl)methane, 2,2-bis(4-hydroxyphenyl)propane, 2,2-bis(3,5-dibromo-4-hydroxyphenyl)propane, 4,4'-dihydroxydiphenyl sulfone, or condensates obtained under acidic conditions from phenols with formaldehyde, e.g. phenol novolacs.

Examples of other possible terminal epoxides are: glycidyl 1-naphthyl ether, glycidyl 2-phenylphenyl ether, 2-biphenyl glycidyl ether, N-(2,3-epoxypropyl)phthalimide, and 2,3-epoxypropyl 4-methoxyphenyl ether.

III) N-Glycidyl compounds attainable via dehydrochlorination of the reaction products of epichlorohydrin with amines containing at least one amino hydrogen atom. Examples of these amines are aniline, N-methylaniline, toluidine, n-butylamine, bis(4-aminophenyl)methane, m-xylylenediamine, and bis(4-methylaminophenyl)methane, and also N,N,O-triglycidyl-m-aminophenol and N,N,O-triglycidyl-p-aminophenol.

However, among the N-glycidyl compounds are also N,N'-di-, N,N',N"-tri-, and N,N',N",N'"-tetraglycidyl derivatives of cycloalkyleneureas, such as ethyleneurea or 1,3-propyleneurea, and N,N'-diglycidyl derivatives of hydantoins, e.g. of 5,5-dimethylhydantoin or glycoluril and triglycidyl isocyanurate.

IV) S-Glycidyl compounds, such as di-S-glycidyl derivatives, where these derive from dithiols, such as ethane-1,2-dithiol, or bis(4-mercaptomethylphenyl)ether.

V) Epoxy compounds having a radical of the above formula in which $R_1$ and $R_3$ together are —$CH_2$—$CH_2$— and n is 0 are bis(2,3-epoxycyclopentyl)ether, 2,3-epoxycyclopentyl glycidyl ether, or 1,2-bis(2,3-epoxycyclopentyloxy)ethane. An example of an epoxy resin having a radical of the above formula in which $R_1$ and $R_3$ together are —$CH_2$—$CH_2$— and n is 1 is 3',4'-epoxy-6'-methylcyclohexylmethyl 3,4-epoxy-6-methylcyclohexanecarboxylate.

Examples of suitable terminal epoxides are:
a) liquid bisphenol A diglycidyl ethers, such as Araldit®GY 240, Araldit®GY 250, Araldit®GY 260, Araldit®GY 266, Araldit®GY 2600, Araldit®MY 790, and Epicote® 828 (BADGE);
b) solid bisphenol A diglycidyl ethers, such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit®GT 6097, Araldit®GT 7097, Araldit®GT 7008, Araldit®GT 6099, Araldit®GT 6608, Araldit®GT 6609, Araldit®GT 6610, and Epikote® 1002;
c) liquid bisphenol F diglycidyl ethers, such as Araldit®GY 281, Araldit®PY 302, Araldit®PY 306 (BFDGE);
d) solid polyglycidyl ethers of tetraphenylethane, such as CG Epoxy Resin®0163;
e) solid and liquid polyglycidyl ethers of phenol-formaldehyde novolac, such as EPN 1138, EPN 1139, GY 1180, PY 307 (NODGE);
f) solid and liquid polyglycidyl ethers of o-cresol-formaldehyde novolac, such as ECN 1235, ECN 1273, ECN 1280, ECN 1299 (NODGE);
g) liquid glycidyl ethers of alcohols, such as Shell Glycidylether® 162, Araldit®DY 0390, Araldit®DY 0391;
h) liquid and solid glycidyl esters of carboxylic acids, examples being Shell Cardura® E terephthalic esters, trimellitic esters, and also mixtures of these, Araldit®PY 284 and Araldit® P811;
i) solid heterocyclic epoxy resins (triglycidyl isocyanurate), such as Araldit® PT 810;
j) liquid cycloaliphatic epoxy resins, such as Araldit®CY 179;

k) liquid N,N,O-triglycidyl ethers of p-aminophenol, such as Araldit®MY 0510; l) tetraglycidyl-4-4'-methylenebenzamine or N,N,N',N'-tetraglycidyldiaminophenyl-methane, such as Araldit®MY 720, Araldit®MY 721.

Epoxy compounds having two functional groups are preferably used. However, epoxy compounds having one, three or more functional groups may in principle also be used.

Epoxy compounds, especially diglycidyl compounds, having aromatic groups are predominantly used.

It is also optionally possible to use a mixture of various epoxy compounds.

β-Diketones and β-Ketoesters 1,3-Dicarbonyl compounds that can be used are linear or cyclic dicarbonyl compounds. Preference is given to dicarbonyl compounds of the formula $R'_1CO\ CHR'_2—COR'_3$, in which $R'_1$ is $C_1$-$C_{22}$-alkyl, $C_5$-$C_{10}$-hydroxyalkyl, $C_2$-$C_{18}$-alkenyl, or phenyl, OH—, $C_1$-$C_4$-alkyl-, $C_1$-$C_4$-alkoxy-, or halogen-substituted phenyl, $C_7$-$C_{10}$-phenylalkyl, $C_5$-$C_{12}$-cycloalkyl, $C_1$-$C_4$-alkyl-substituted $C_5$-$C_{12}$-cycloalkyl, or a —$R'_5$—S—$R'_6$ group or —$R'_5$—O—$R'_6$; $R'_2$ is hydrogen, $C_1$-$C_8$-alkyl, $C_2$-$C_{12}$-alkenyl, phenyl, $C_7$-$C_{12}$-alkylphenyl, $C_7$-$C_{10}$-phenylalkyl, or a —CO—$R'_4$ group; $R'_3$ has one of the meanings stated for $R'_1$, or is $C_1$-$C_{18}$-alkoxy, $R'_4$ is $C_1$-$C_4$-alkyl or phenyl; $R'_5$ is $C_1$-$C_{10}$-alkylene, and $R'_6$ is $C_1$-$C_{12}$-alkyl, phenyl, $C_7$-$C_{18}$-alkylphenyl, or $C_7$-$C_{10}$-phenylalkyl.

Among these are the diketones containing hydroxy groups, EP 0.346.279 A1 and the oxa- and thiadiketones in EP 0.307.358 A1, and also the isocyanuric-acid-based ketoesters in U.S. Pat. No. 4,339,383.

$R'_1$ and $R'_3$ as alkyl can in particular be $C_1$-$C_{18}$-alkyl, e.g. methyl, ethyl, n-propyl, isopro-pyl, n-butyl, tert-butyl, pentyl, hexyl, heptyl, octyl, decyl, dodecyl, or octadecyl.

$R'_1$ and $R'_3$ as hydroxyalkyl are in particular a —$(CH_2)_n$—OH group, in which n is 5, 6, or 7.

$R'_1$ and $R'_2$ as alkenyl can by way of example be vinyl, allyl, methallyl, 1-butenyl, 1-hexenyl or oleyl, preferably allyl.

$R'_1$ and $R'_3$ as OH—, alkyl-, alkoxy-, or halogen-substituted phenyl can by way of example be tolyl, xylyl, tert-butylphenyl, methoxyphenyl, ethoxyphenyl, hydroxyphenyl, chlorophenyl, or dichlorophenyl.

$R'_1$ and $R'_3$ as phenylalkyl are in particular benzyl. $R'_2$ and $R'_3$ as cycloalkyl or alkylcycloalkyl are in particular cyclohexyl or methylcyclohexyl.

$R'_2$ as alkyl can in particular be $C_1$-$C_4$-alkyl. $R'_2$ as $C_2$-$C_{12}$-alkenyl can in particular be allyl. $R'_2$ as alkylphenyl can in particular be tolyl. $R'_2$ as phenylalkyl can in particular be benzyl. It is preferable that $R'_2$ is hydrogen. $R'_3$ as alkoxy can by way of example be methoxy, ethoxy, butoxy, hexyloxy, octyloxy, dodecyloxy, tridecyloxy, tetradecyloxy, or octadecyloxy. $R'_5$ as $C_1$-$C_{10}$-alkylene is in particular $C_2$-$C_4$-alkylene. $R'_6$ as alkyl is in particular $C_4$-$C_{12}$-alkyl, e.g. butyl, hexyl, octyl, decyl, or dodecyl.

$R'_6$ as alkylphenyl is in particular tolyl. $R'_6$ as phenylalkyl is in particular benzyl.

Examples of 1,3-dicarbonyl compounds of the above general formula, and also the alkali metal, alkaline earth metal, and zinc chelates of these, are acetylacetone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoylbenzoylmethane, stearoylbenzoylmethane, isooctylbenzoylmethane, 5-hydroxy-capronylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxybenzoyl) methane, 1-benzoyl-1-acetylnonane, benzoylacetylphenylmethane, stearoyl-4-methoxybenzoylmethane, bis(4-tert-butylbenzoyl)methane, benzoylformylmethane, benzoylphenylacetylmethane, biscyclohexanoylmethane, dipivaloylmethane, 2-acetylcyclopentanone, 2-benzoylcyclopentanone, methyl, ethyl, and allyl diacetoacetate, methyl and ethyl benzoyl-, propionyl-, and butyrylacetoacetate, triacetylmethane, methyl, ethyl, hexyl, octyl, dodecyl, or octadecyl acetoacetate, methyl, ethyl, butyl, 2-ethylhexyl, dodecyl, or octadecyl benzoylacetoacetate, and also $C_1$-$C_{18}$-alkyl esters of propionyl- and butyrylacetic acid, ethyl, propyl, butyl, hexyl, or octyl stearoylacetate, and also polynuclear β-ketoesters as described in EP-A 0 433 230, and dehydroacetic acid, and also the zinc, magnesium, or alkaline earth metal salts thereof. Preference is given to the Ca, Mg, and Zn salts of acetylacetone and of dehydroacetic acid.

Particular preference is given to 1,3-diketo compounds of the above formula in which $R'_1$ is $C_1$-$C_{18}$-alkyl, phenyl, OH—, methyl-, or methoxy-substituted phenyl, $C_7$-$C_{10}$-phenylalkyl, or cyclohexyl, $R'_2$ is hydrogen, and $R'_3$ has one of the meanings stated for $R'_1$. The compounds here also include heterocyclic 2,4-diones, such as N-phenyl-3-acetylpyrrolidine-2,4-dione. Further representatives of this category are described in EP 0.734.414 A1. An example of an amount that can be used of the 1,3-diketo compounds is from 0.01 to 10 parts by weight, advantageously from 0.01 to 3 parts by weight, and in particular from 0.01 to 2 parts by weight, based on 100 parts by weight of PVC.

Polyols and Sugar Alcohols

Examples of compounds of this type that can be used are: pentaerythritol, dipentaerythritol, tripentaerythritol, trimethylolethane, bistrimethylolpropane, inositol, polyvinyl alcohol, bistrimethylolethane, trimethylolpropane, sorbitol, maltitol, isomaltitol, Lycasin, mannitol, lactose, leucrose, tris (hydroxyethyl)isocyanurate, palatinitol, tetramethylcyclohexanol, tetramethylolcyclopentanol, tetramethylolpyranol, glycerol, diglycerol, polyglycerol, thiodiglycerol, or 1-O-α-D-glycopyranosyl-D-mannitol dihydrate. Preference is given to disaccharide alcohols. Polyol syrups are also used, e.g. sorbitol syrup, mannitol syrup, and maltitol syrup. An example of an amount that can be used of the polyols is from 0.01 to 20 parts by weight, advantageously from 0.1 to 20 parts by weight, and in particular from 0.1 to 10 parts by weight, based on 100 parts by weight of PVC. Tris(hydroxyethyl)isocyanurate is preferred.

Phosphorous Esters (Phosphites)

Examples of these are trioctyl, tridecyl, tridodecyl, tritridecyl, tripentadecyl, trioleyl, tristearyl, triphenyl, trilauryl, tricresyl, trisnonylphenyl, tris-2,4-tert-butylphenyl, or tricyclohexyl phosphite. Other suitable phosphites are various mixtures of aryl dialkyl or alkyl diaryl phosphites, e.g. phenyl dioctyl, phenyl didecyl, phenyl didodecyl, phenyl ditridecyl, phenyl ditetradecyl, phenyl dipentadecyl, octyl diphenyl, decyl diphenyl, undecyl diphenyl, dodecyl diphenyl, tridecyl diphenyl, tetradecyl diphenyl, pentadecyl diphenyl, oleyl diphenyl, stearyl diphenyl, and dodecyl bis-2,4-di-tert-butylphenyl phosphite. It is also advantageously possible to use phosphites of various di- or polyols, e.g. tetraphenyl dipropylene glycol diphosphite, poly(dipropylene glycol) phenyl phosphite, tetraisodecyl dipropylene glycol diphosphite, tris-dipropylene glycol phosphite, tetramethylolcyclohexanol decyl diphosphite, tetramethylolcyclohexanol butoxyethoxyethyl diphosphite, tetramethylolcyclohexanol nonylphenyl diphosphite, bisnonylphenylditrimethylolpropane diphosphite, bis-2-butoxyethylditrimethylolpropane diphosphite, trishydroxyethyl isocyanurate hexadecyl triphosphite, didecyl pentaerythritol diphosphite, distearyl pentaerythritol diphosphite, bis-2,4-di-tert-butylphenyl pentaerythritol diphosphite, and also mixtures of these phosphites, and aryl/ alkyl phosphite mixtures of statistical composition ($H_{19}C_9$—$C_6H_4)O_{1.5}P(OC_{12,13}H_{25,27})_{1.5}$, or $(C_8H_{17}$—$C_6H_4$—$O$—$)_2P$ (iso-$C_8H_{17}O$), ($H_{19}C_9$—$C_6H_4)O_{1.5}P(OC_{9,11}H_{19,23})_{1.5}$. Industrial examples are Naugard P, Mark CH300, Mark CH301, Mark CH302, and Mark CH55 (producer: Crompton Corp. USA). An example of an amount that can be used of the organic phosphites is from 0.01 to 10 parts by weight, advantageously from 0.05 to 5 parts by weight, and in particular from 0.1 to 3 parts by weight, based on 100 parts by weight of PVC.

The auxiliaries and additives (C) can be those selected from the group consisting of
acrylates
UV absorbers and light stabilizers
optical brighteners
pigments
blowing agents
antistatic agents
plasticizers.

Acrylates

In the present case, the acrylate serves as processing aid, i.e. as auxiliary and additive (C).

Acrylate-based auxiliaries suitable for processing are known to the person skilled in the art.

One particularly preferred embodiment of the present invention uses, as acrylate, a polymethyl methacrylate. An example here is Paraloid K 125® from Rohm & Haas.

UV Absorbers and Light Stabilizers

Examples of these are 2-(2'-hydroxyphenyl)benzotriazoles, e.g. 2-(2'-hydroxy-5'-methyl-phenyl)benzotriazole, 2-hydroxybenzophenones, esters of optionally substituted benzoic acids, e.g. 4-tert-butyl-phenyl salicylate, phenyl salicylate, acrylates, nickel compounds, oxalamides, e.g. 4,4'-dioctyloxyoxanilide, 2,2'-dioctyloxy-5,5'-di-tert-butyloxanilide, 2-(2-hydroxyphenyl)-1,3,5-triazines, e.g. 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, sterically hindered amines based on tetramethylpiperidine and, respectively, tetramethylpiperazinone, or tetramethylmorpholinone, e.g. bis(2,2,6,6-tetramethylpiperidin-4-yl) sebacate, bis(2,2,6,6-tetramethylpiperidin-4-yl) succinate, and also benzoxazinones, such as 1,4-bisbenzoxazinonylbenzene.

Optical Brighteners

Examples of these are bisbenzene(1,4)oxazoles, phenylcoumarins, and bisstyrylbiphenyls, e.g. 4-methyl-7-diethylaminocoumarin, 3-phenyl-7-(4-methyl-6-butoxybenzoxazole)coumarin, 4,4'-bis(benzoxazol-2-yl)stilbene, and 1,4-bis(benzoxazol-2-yl)naphthalene. Preference is given to solutions of optical brighteners in a plasticizer, such as DOP.

Pigments

Pigments are another suitable constituent of the stabilizer system of the invention. The person skilled in the art is aware of suitable substances. Examples of inorganic pigments are $TiO_2$, zirconium-oxide-based pigments, $BaSO_4$, zinc oxide (zinc white), and lithopones (zinc sulfide/barium sulfate), carbon black, carbon-black-titanium-dioxide mixtures, iron oxide pigments, $Sb_2O_3$, $(Ti,Ba,Sb)O_2$, $Cr_2O_3$, spinelles, such as cobalt blue and cobalt green, Cd(S,Se), ultramarine blue. Examples of organic pigments are azo pigments, phthalocyanine pigments, quinacridone pigments, perylene pigments, diketopyrrolopyrrole pigments, and anthraquinone pigments. Preference is given to $TiO_2$, also in micronized form. "Handbook of PVC Formulating", E. J. Wickson, John Wiley & Sons, New York, 1993 gives a definition and further descriptions.

Blowing Agents

Examples of blowing agents are organic azo and hydrazo compounds, tetrazoles, oxazines, isatinic anhydride, N-methylisatinic anhydride, and also soda and sodium bicarbonate. Preference is given to azodicarbonamide and sodium bicarbonate, and also to mixtures of these. Very particular preference is given to isatinic anhydride or N-methylisatinic anhydride, specifically in flexible PVC or semirigid PVC.

Antistatic Agents

Antistatic agents are divided into nonionic (a), anionic (b), cationic (c), and amphoteric (d) classes. Among (a) are fatty acid ethoxylates, fatty acid esters, ethoxylated fatty alkylamines, fatty acid diethanolamides, and ethoxylated phenols and alcohols, and also monofatty acid esters of polyglycols. Among (b) are the fatty alkanesulfonates of alkali metals and the alkali metal salts of bis(fatty alcohol) esters of phosphoric acid. Among (c) are quaternary fatty alkylammonium salts, and among (d) are fatty alkyl betaines and fatty alkylimidazoline betaines. Individual preferred compounds are lauric diethanolamide, myristyldiethanolamine, Na octadecylsulfonate, and Na bisoctadecyl phosphate.

Plasticizers

Organic plasticizers are also suitable auxiliaries and additives (C) for the pelletized stabilizer mixture of the present invention. Examples of organic plasticizers that can be used are those from the following groups:

(i) phthalic esters, preferred examples being di-2-ethylhexyl, diisononyl, and diisodecyl phthalate, which are also known by the familiar abbreviations DOP (dioctyl phthalate, di-2-ethylhexyl phthalate), DINP (diisononyl phthalate), and DIDP (diisodecyl phthalate), (ii) esters of aliphatic dicarboxylic acids, in particular esters of adipic, azelaic, and sebacic acid, preference being given to di-2-ethylhexyl adipate and diisooctyl adipate, (iii) trimellitic esters, such as tri-2-ethylhexyl trimellitate, triisodecyl trimellitate (mixture), triisotridecyl trimellitate, triisooctyl trimellitate (mixture), and also tri-$C_6$-$C_8$-alkyl, tri-$C_6$-$C_{10}$-alkyl, tri-$C_7$-$C_9$-alkyl, and tri-$C_9$-$C_{11}$-alkyl trimellitates; familiar abbreviations are TOTM (trioctyl trimellitate, tri-2-ethylhexyl trimellitate), TIDTM (triisodecyl trimellitate), and TITDTM (triisotridecyl trimellitate), (iv) epoxy plasticizers; these are mainly epoxidized unsaturated fatty acids, e.g. epoxidized soybean oil, (v) polymeric plasticizers: the most familiar starting materials for producing these are dicarboxylic acids such as adipic, phthalic, azelaic, and sebacic acid, and diols, such as 1,2-propanediol, 1,3-butanediol, 1,4-butanediol, 1,6-hexanediol, neopentyl glycol, and diethylene glycol, (see ADMEX® grades from Velsicol Corp. and PX-811 from Asahi Denka), (vi) phosphoric esters: a definition of these esters can be found on pages 408-412 in chapter 5.9.5 of "TASCHENBUCH der Kunststoffadditive" [Plastics additives handbook]. Examples of these phosphoric esters are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, resorcinol bisdiphenyl phosphate, triphenyl phosphate, tricresyl phosphate, and trixylenyl phosphate; preference is given to tri-2-ethylhexyl phosphate and to Reofos® 50 and 95 (see Ciba Spezialitätenchemie), (vii) chlorinated hydrocarbons (paraffins), (viii) hydrocarbons, (ix) monoesters, e.g. butyl oleate, phenoxyethyl oleate, tetrahydrofurfuryl oleate, and alkylsulfonic esters, (x) glycol esters, e.g. diglycol benzoates, (xi) citric esters, e.g. tributyl citrate and tributyl acetylcitrate, as described in the patent WO 02/05206, (xii) perhydrophthalic, -isophthalic, and -terephthalic esters, and also perhydrogenated glycol and diglycol benzoates; preference is given to perhydrogenated diisononyl phthalate (Hexamoll® DINCH—producer: BASF), as described in the patents DE 197.56.913 A1, DE 199.27.977 A1, DE 199.27.978 A1, and DE 199.27.979 A1.

(xiii) Castor-oil-based plasticizers (Soft-N-Safe®, producer: DANISCO), (xiv) ketone-ethylene-ester terpolymers: Elvaloy® KEE, (Elvaloy® 741, Elvaloy® 742, producer: DuPont).

A definition of these plasticizers and examples of the same are given in pages 412-415 of chapter 5.9.6 of "TASCHENBUCH der Kunststoffadditive" [Handbook of plastics additives], R. Gächter/H. Müller, Carl Hanser Verlag, $3^{rd}$ edn., 1989, and also on pages 165-170 of "PVC Technology", W. V. Titow, $4^{th}$. edn., Elsevier Publ., 1984. Mixtures of various plasticizers may be used. An example of an amount that can be present of the plasticizers is up to about 99.5% by weight, in particular up to about 30% by weight, up to about 20% by weight, or up to about 10% by weight. For the purposes of one preferred embodiment of the present invention, the lower limit for these plasticizers as constituents of the stabilizer systems of the invention is about 0.1% by weight or more, for example about 0.5% by weight, 1% by weight, 2% by weight, or 5% by weight.

Definitions and examples of further additives, such as impact modifiers and processing aids, gelling agents, biocides, metal deactivators, flame retardants, antifogging agents, and also compatibilizers, are described in "Handbuch der Kunststoffadditive" [Handbook of plastics additives], R. Gächter/H. Müller, Carl Hanser Verlag, $3^{rd}$ edn., 1989, and also $4^{th}$ edn. 2001, and in "Handbook of Polyvinyl Chloride Formulating" E. J. Wickson, J. Wiley & Sons, 1993, also in "Plastics Additives" G. Pritchard, Chapman & Hall, London, 1st Ed., 1998. Impact modifiers are also described in detail in "Impact Modifiers for PVC", J. T. Lutz/D. L. Dunkelberger, John Wiley & Sons, 1992.

Examples of the % by weight of the substances (A), (B), and (C) present in the mixture (based on 100% by weight of the entire mixture) are the following:
  (A): from 5 to 70% by weight, preferably from 20 to 45% by weight, particularly preferably from 30 to 35% by weight;
  (B): from 5 to 70% by weight, preferably from 30 to 50% by weight, particularly preferably from 40 to 50% by weight;
  (C): from 5 to 70% by weight, preferably from 20 to 40% by weight, particularly preferably from 20 to 30% by weight.

The stated proportions are merely examples of, or preferred, proportions and the proportions can also be outside of the stated ranges. To the extent that a substance can be classified as having a plurality of components (A), (B), and (C), the sequence to be used with respect to the component mentioned first is (A)-(B)-(C).

In another embodiment of the invention, the mixture of the invention is first heated in step (a) in the extruder at from 40° C. to 100° C., preferably from 55° C. to 65° C., particularly preferably at 60° C. An estimated average residence time here in the extruder can be a period of not more than 10 minutes.

Extruders that can be used are any of the familiar extruders known to the person skilled in the art, for example corotating, contrarotating, parallel, or conical, single-screw, or twin-screw extruders. It is also possible to use various kneaders.

In step (b), the compacted mixture of the invention, to some extent previously melted in the extruder, is forced through a pelletizing die.

In step (c), die-face pelletization is carried out, i.e. the strands, to some extent viscous, are separated transversely in a stream of water. This procedure gives prepellets which have not hardened completely and are kneadable, and in step (d) these then harden increasingly from the outside to the inside in a stream of water.

In step (e), the pelletized, non-conglutinating stabilizer mixture is extracted from the water bath.

In step (f), the pelletized stabilizer mixtures extracted from the water are dried, and the finished pelletized stabilizer mixtures are obtained.

The drying procedure (f) preferably takes place from a sieve with a blower, or by way of a sieve with vibration drying and optionally a (heatable) blower. However, other drying methods can also be used for the purposes of the invention, for example a centrifuge or belt dryer.

The advantage of the process of the invention for producing a pelletized stabilizer mixture for halogen-containing plastics through underwater pelletization is that said process features low space requirement, high flexibility, minimal stoppage times, low amounts of waste, rapid and easy pellet-size change, very low emission levels, and especially, in comparison with compressed pellets, less dusting and lower abrasion, and also better dispersibility in steps of processing, and also, associated therewith, a product of high and consistent quality.

Other advantages are the relatively low process temperature when comparison is made with processes used hitherto for producing compressed pellets, and the low residence time in the reaction vessel, which in turn allows, in comparison with pastilles from the melt process, a reduced level of thermal and time-related stress, a substantial energy saving, and also therefore the use of components which otherwise react with one another or are thermally unstable.

Another factor is that different amounts of lubricants and/or of low-melting-point components melt, depending on the temperature and the composition of the stabilizer. The viscosity of the extrudate can thus be adjusted as required.

Another advantage of the process of the invention and of the product is the fact that, when comparison is made with compressed pellets, the pellets produced by means of underwater pelletization exhibit a markedly reduced sieve residue, using the dryblend method at 120° C. mixing temperature. The pellets moreover have comparable particle sizes, and these can be appropriately adjusted individually as required by the application—for example by using various pelletizing dies.

The present invention further provides a pelletized stabilizer mixture obtainable by the process of the invention.

The present invention further provides the use of the pelletized stabilizer mixtures of the invention for stabilizing a halogen-containing, in particular chlorine-containing, polymer, such as polyvinyl chloride (PVC).

Examples of the chlorine-containing polymers to be stabilized are polymers of vinyl chloride, vinylidene chloride, vinyl resins containing vinyl chloride units, e.g. copolymers of vinyl chloride and vinyl ester of aliphatic acids, in particular vinyl acetate, copolymers of vinyl chloride with esters of acrylic and methacrylic acid, and with acrylonitrile, copolymers of vinyl chloride with diene compounds and unsaturated dicarboxylic acids, or anhydrides of these, e.g. copolymers of vinyl chloride with diethyl maleate, diethyl fumarate, or maleic anhydride, postchlorinated polymers and copolymers of vinyl chloride, copolymers of vinyl chloride and of vinylidene chloride with unsaturated aldehydes, ketones, and other compounds, e.g. acrolein, crotonaldehyde, vinyl methyl ketone, vinyl methyl ether, vinyl isobutyl ether, and the like; polymers of vinylidene chloride and copolymers of the same with vinyl chloride and with other polymerizable compounds; polymers of vinyl chloroacetate and of dichlorodivinyl ether; chlorinated polymers of vinyl acetate, chlorinated polymers of esters of acrylic acid and of α-substituted acrylic acid; polymers of chlorinated styrenes, e.g. dichlorostyrene; chlororubbers; chlorinated polymers of ethylene; polymers and postchlorinated polymers of chlorobutadiene and copolymers of these with vinyl chloride, chlorinated natural and chlorinated synthetic rubbers, and also mixtures involving only the abovementioned polymers or also involving other polymerizable compounds. For the purposes of this invention, the term PVC also includes copolymers of vinyl chloride with polymerizable compounds, such as acrylonitrile, vinyl acetate, or ABS, and these can be suspension, bulk or emulsion polymers.

Preference is given to a PVC homopolymer, which can also be in a combination with polyacrylates or with polymethacrylates.

It is also possible to use graft polymers of PVC with EVA, ABS, and MBS, or else graft polymers of PVC with PMMA. Other preferred substrates are mixtures of the abovementioned homo- and copolymers, in particular vinyl chloride homopolymers, with other thermoplastic or/and elastomeric polymers, in particular blends with ABS, MBS, NBR, SAN, EVA, CPE, MBAS, PMA, PMMA, EPDM, and with polylactones, in particular from the following group: ABS, NBR, NAR, SAN, and EVA. The abbreviations used for the copolymers are familiar to the person skilled in the art and have the following meanings ABS acrylonitrile-butadiene-styrene; SAN styrene-acrylonitrile; NBR acrylonitrile-butadiene; NAR acrylonitrile-acrylate; EVA ethylene-vinyl acetate. It is also possible in particular to use styrene-acrylonitrile copolymers based on acrylate (ASA). In this context, preference is given, as component, to polymer compositions which comprise, as components (i) and (ii), a mixture of from 25 to 75% by weight of PVC and from 75 to 25% by weight of the abovementioned copolymers. A particularly important component is compositions made of (i) 100 parts by weight of PVC and (ii) from 0 to 300 parts by weight of ABS and/or SAN-modified ABS, and from 0 to 80 parts by weight of the following copolymers: NBR, NAR, and/or EVA, but in particular EVA.

For the purposes of this invention, other materials that can be stabilized are in particular recyclates of chlorine-containing polymers, where these are the polymers described in more detail above, which have been degraded by processing, use, or storage. PVC recyclate is particularly preferred. Another use of the stabilizer system of the invention is based on providing antistatic properties to the finished item made of rigid or flexible PVC. This method permits reduced use of expensive antistatic agents. Flexible PVC or semirigid PVC is preferred for this application.

The present invention further provides articles which comprise a composition of the invention. These preferably involve consumer articles. Examples here are wood-plastics-composite materials (WPC), foils, profiles, floorcoverings, motor-vehicle parts, wallpapers, hoses, injection moldings, wire sheathing, pipes, or sheets.

The present invention further provides the use of a composition of the invention for producing an article of the invention.

The invention further provides consumer articles which in particular comprise PVC and pelletized stabilizer mixtures of the invention.

Preference is also given to the use of consumer items which feature a particular fine foam structure. This applies to rigid, flexible, and semirigid PVC. This aspect is particularly important for wallcoverings and floors made of flexible PVC. Heavy-metal compounds, such as Zn stabilizers or Sn stabilizers, are normally required as kickers for obtaining a fine foam. Surprisingly, it has been found that TEA-metal inner complexes exert a kicker effect on isatinic anhydride or N-methylisatinic anhydride, ensuring that a fine foam structure is obtained.

The compositions of the invention have particular suitability, in the form of rigid formulations, for hollow bodies (bottles), foils, including packaging foils (thermoforming foils), blow foils, "crashpad" foils (automobiles), and foils in the office sector, pipes, foams, profiles, including heavy-duty profiles (window frames), luminous-wall profiles, construction profiles, blister packs (including those produced by the Luvitherm process), sidings, fittings, margarine tubs, packaging for chocolates and housings for apparatus, insulators, computer housings, and constituents of household equipment, and they are also for electronics applications, in particular in the semiconductor sector. They are very particularly suitable for producing window profiles with high whiteness and surface luster.

Preferred other compositions in the form of semirigid and flexible formulations are for wire sheathing, cable insulation, decorative foils, roofing foils, foams, agricultural foils, hoses, gasket profiles, floorcoverings, wallpapers, motor-vehicle parts, flexible foils, injection moldings (blow molding), foils for the office sector, and foils for air-supported structures. Examples of the use of the compositions of the invention as plastisols are children's products (rotational molding), synthetic leather, floorcoverings, textile coatings, wallpapers, coil-coating applications, and underbody protection for motor vehicles, and examples of sinter PVC applications of the compositions of the invention are slush, slush mold, and coil-coating applications, and also, in EPVC, foils produced by the Luvitherm process. For more details in this connection, see "KUNSTSTOFFHANDBUCH PVC" [Plastics handbook: PVC], volume 2/2, W. Becker/H. Braun, $2^{nd}$ edn. 1985, Carl Hanser Verlag, pp. 1236-1277.

EXAMPLES

The substances indicated in Table 1, made of (A), (B), and (C), were used:

TABLE 1

| Substance | Component | Proportion [%] | Melting point [° C.] |
|---|---|---|---|
| Modified PE wax | (A) | 7 | 90-100 |
| PE wax | (A) | 8 | 97-110 |
| Synthetic hard wax | (A) | 4 | 114-120 |
| Hydrotalcite | (B) | 20 | did not melt |
| Zinc soap of fatty acids | (B) | 14 | 120-122 |
| Antioxidant | (B) | 3 | 50-55 |
| THEIC* | (B) | 2 | 132-138 |
| Calcium acetylacetonate | (B) | 3 | did not melt |
| Rhodiastab 55 P | (B) | 1 | 58 |
| Fatty acid ester | (A) | 8 | 46-49 |
| Dipentaerythritol | (B) | 5 | high MP |
| Fatty acid ester of polyhydric alcohols | (A) | 1 | 65 |
| Acrylate | (C) | 24 | 108** |

*THEIC: Trishydroxyethyl isocyanurate
**Glass transition temperature

The components were charged to the extruder and heated to 55° C. The partially liquefied mixture was then forced through a pelletizing die. The resultant individual strands were subjected to die-face cutting in a stream of water, and thus formed pellets. The pellets were extracted from the water and dried from a sieve with a blower.

Sieve residue was measured on the resultant pellets in comparison with compressed pellets and powders using the dryblend method:

Sieve residue using the dryblend method at 120° C. mixing temperature

TABLE 2

| Product form | Residue, 315μ [%] | Residue 250μ [%] |
|---|---|---|
| Compressed pellets | 0.61 | 1.35 |
| UWP pellets | 0.53 | 1.18 |

Table 2 shows that when the UWP pellets of the invention are compared with compressed pellets, which undergo markedly more abrasion by virtue of irregular composition and surface quality, the former exhibit markedly less sieve residue.

What is claimed is:

1. A process for producing a pelletized stabilizer mixture for halogen-containing plastics, comprising the following steps:
    (a) heating, at a temperature from 40 to a maximum of 100° C. in an extruder or kneader, a stabilizer mixture comprising
        (A) at least one lubricant selected from the group consisting of montan waxes, aromatic or aliphatic esters, fatty acid esters, amide waxes, polyethylene waxes, chloroparaffins, glycerol esters or alkaline-earth-metal soaps, modified polyethylene waxes, synthetic hard waxes, fatty ketones, and combinations of fatty ketones,
        (B) at least one substance having stabilizer activity selected from the group consisting of coordination polymers, metal inner complexes, heavy-metal-containing stabilizers, Ca/Zn stabilizers based on hydrotalcite, zeolites and dawsonites, hydrocalumites, stearoylbenzoylmethane, and sterically hindered amines (HALS), heterocyclic amino alcohols, and antioxidants, inorganic and organic bases, epoxides and glycidyl compounds, β-diketones and β-ketoesters, polyols, and sugar alcohols, and phosphorous esters, and
        (C) auxiliaries and additives selected from the group consisting of acrylates, UV absorbers, and light stabilizers, optical brighteners, pigments, blowing agents, antistatic agents, and plasticizers,
    where at least 1% by weight of the entire stabilizer mixture, based on the total amount of the mixture, has a melting point below 100° C.,
    (b) forcing the material through a pelletizing die,
    (c) carrying out die-face pelletization under water,
    (d) transporting the pelletized stabilizer mixture away in a stream of water,
    (e) extracting the pelletized stabilizer mixture from the water, and
    (f) drying the pelletized stabilizer mixture.

2. The process as claimed in claim 1, characterized in that at least 10% by weight of the entire stabilizer mixture has a melting point below 100° C.

3. The process as claimed in claim 1, characterized in that at least 13% by weight of the entire stabilizer mixture has a melting point below 100° C.

4. The process as claimed in claim 1, characterized in that the heating in the extruder in step (a) takes place to a temperature in the range from 55° C. to 65° C.

* * * * *